(12) United States Patent
Corba

(10) Patent No.: US 6,857,418 B2
(45) Date of Patent: Feb. 22, 2005

(54) FUEL INJECTION TIMING COMPENSATION BASED ON ENGINE LOAD

(75) Inventor: David Corba, Des Plaines, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/271,235

(22) Filed: Oct. 15, 2002

(65) Prior Publication Data

US 2004/0069281 A1 Apr. 15, 2004

(51) Int. Cl.$^7$ .............................................. F02M 51/00
(52) U.S. Cl. .................. 123/478; 123/472; 123/480; 123/492
(58) Field of Search .......................... 123/478, 472, 123/480, 492

(56) References Cited

U.S. PATENT DOCUMENTS

| | | | | |
|---|---|---|---|---|
| 4,785,784 A | * | 11/1988 | Nanyoshi et al. | ........... 123/478 |
| 5,056,491 A | * | 10/1991 | Tsukamoto | ................. 123/492 |
| 5,101,795 A | * | 4/1992 | Hirschmann et al. | ....... 123/488 |
| 5,771,867 A | | 6/1998 | Amstutz et al. | |
| 6,178,943 B1 | * | 1/2001 | Taga et al. | ................. 123/295 |
| 6,364,282 B1 | | 4/2002 | Ausman et al. | |
| 6,386,176 B1 | | 5/2002 | McGee | |

\* cited by examiner

Primary Examiner—Bibhu Mohanty
(74) Attorney, Agent, or Firm—Susan L. Lukasik; Dennis Kelly Sullivan; Jeffrey P. Calfa

(57) ABSTRACT

An apparatus for and method of providing improved engine performance during a change in engine load conditions reduces or eliminates engine stumbling or hesitation and/or reduces emissions levels. When an engine load change is detected (201), a compensation factor for fuel injection timing is determined (205) and combined with a base timing for fuel injection, thereby altering fuel injector timing during the transition period.

18 Claims, 1 Drawing Sheet

FUEL INJECTION TIMING COMPENSATION BASED ON ENGINE LOAD

FIELD OF THE INVENTION

This invention relates to internal combustion engines, including but not limited to timing for fuel injectors in diesel engines.

BACKGROUND OF THE INVENTION

Dynamic fuel injection timing is known in diesel engines. Dynamic fuel injection timing is utilized to determine a desired crankshaft position at which to send a signal or pulsewidth to the fuel injector to begin fuel injection into an engine cylinder based on variousengine operating parameters. Crankshaft position is measured as the number of degrees before top dead center (BTDC) of the cylinder whose injector will receive the next timing pulse.

In order to enhance engine performance, various methods are utilized, including methods involving dynamic fuel injection timing. These methods may, however, result in stumbling or hesitation in the engine under certain conditions, such as when the engine experiences a change in load conditions, such as during vehicle acceleration or when climbing a grade.

Accordingly, there is a need to reduce or eliminate engine stumbling or hesitation during a change in engine load conditions while providing reduced emissions levels.

SUMMARY OF THE INVENTION

A method of compensating for engine load change in fuel injection timing includes the steps of detecting an engine load change for an engine and compensating fuel injection timing for at least one cylinder in the engine based on the engine load change, such that at least one of enhanced engine performance and lower emissions levels for the engine results.

DESCRIPTION OF A PREFERRED EMBODIMENT

The following describes an apparatus for and method of providing improved engine performance during a change in engine load conditions, which method reduces or eliminates engine stumbling or hesitation and/or reduces engine emissions levels. When an engine load change is detected, a compensation factor for fuel injection timing is determined and combined with a base timing for fuel injection or a timing that has been adjusted for other compensation factors such as engine speed, thereby altering fuel injector timing during the transition period.

Figure 1:
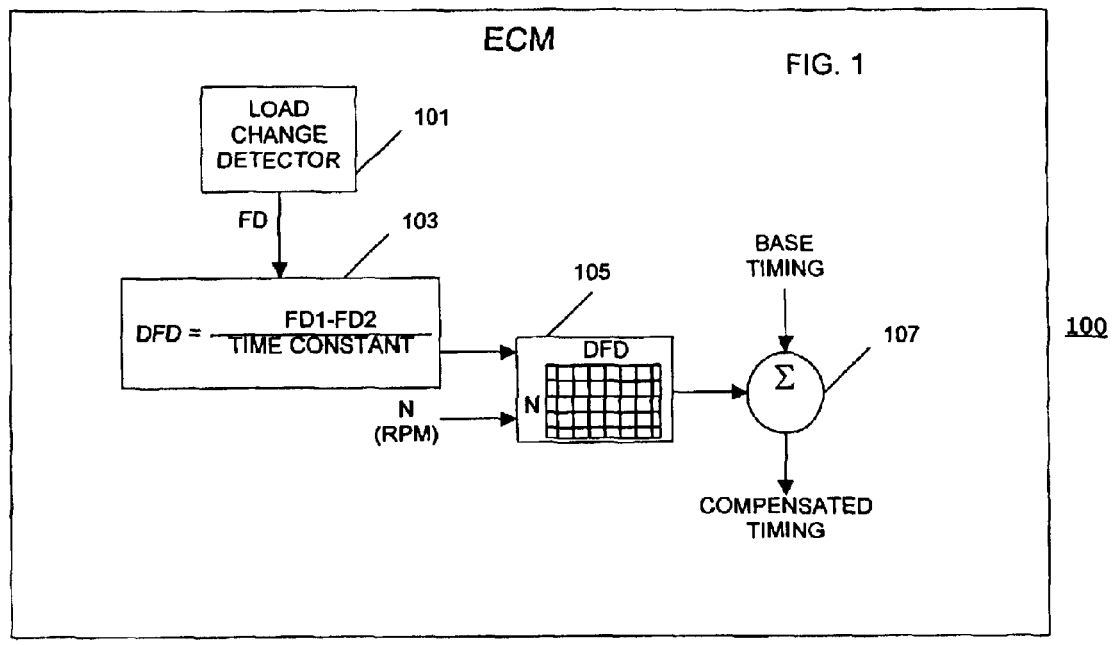
FIG. 1 is a block diagram of an engine control module that compensates fuel injection timing based on engine load change in accordance with the invention.

A diagram illustrating a control module that compensates for a change in load is shown in FIG. 1. In the embodiment described herein, an engine control module (ECM) 100 is utilized to determine the crankshaft position at which to transmit a command to send a fueling pulse to a fuel injector for an engine cylinder. The ECM may be a conventional engine control module that is readily available in the industry.

A load change detector 101 detects changes in engine load. Engine load changes may occur at constant engine speed or at varying engine speed conditions. Load change may be determined by comparing actual fuel demand amounts or requests for fuel at different times. Fuel demand is determined by the ECM 100 as a function of amount of fuel required to maintain a desired engine speed/load via input of the accelerator pedal. When the fuel demand changes by a predetermined quantity, a load change is considered to have occurred. Other methods of determining load change may also be utilized. During the time while a load change occurs, compensation for fuel injector timing is provided.

A block 103 within the ECM receives fuel demand (FD) inputs from the load change detector 101, or other appropriate device, at various times and determines a differential fuel demand (DFD) by subtracting two fuel demands (FD1 and FD2) and dividing the result by a time constant. The time constant typically represents the execution rate or sampling rate of the ECM.

The DFD and engine speed N in revolutions/minute are the variables for a table 105 that includes timing adjustments that compensate for the change in load. DFD may be measured in (milligrams per stroke) per second. An example of such a table is shown in Table 1 below.

TABLE 1

| | | DFD in (mg/stk)/s | | | | | | |
|---|---|---|---|---|---|---|---|---|
| | | DFD1 | DFD2 | DFD3 | DFD4 | DFD5 | ... | DFDn |
| N | N1 | 0 | 0 | 0 | 0 | 0 | ... | 0 |
| RPM | N2 | 0 | 0 | 0 | 0 | 1 | ... | 0 |
| | N3 | 1 | 2 | 3 | 4 | 3 | ... | 0 |
| | N4 | 1 | 2 | 3 | 4 | 3 | ... | 0 |
| | N5 | 1 | 2 | 3 | 4 | 3 | ... | 0 |
| | N6 | 0 | 2 | 3 | 4 | 3 | ... | 0 |
| | N7 | 0 | 0 | 0 | 2 | 1 | ... | 0 |
| | ... | ... | ... | ... | ... | ... | ... | ... |
| | Nm | 0 | 0 | 0 | 0 | 0 | ... | 0 |

These timing adjustments, which may be positive or negative, are stored in degrees BTDC or degrees crank angle (dca). Table 1 includes timing adjustments for m engine speeds and n DFDs, where m and n are integers greater than 0. Values reflecting timing adjustments for fuel injection are established in order to reduce emissions levels for an engine. In addition, these values are selected to improve engine performance, e.g., to increase engine response and reduce or eliminate engine stumbling or hesitation during changing load conditions. These values are determined by empirical investigations that optimize engine performance and reduce exhaust emissions by running the FTP (Federal Test Procedure) emissions cycle or other appropriate emissions testing and/or evaluation test cycle in an engine or vehicle test cell. Engine stumbling or hesitation occurs because fuel injection timing is often excessively retarded to reduce oxides of nitrogen (NOx) emissions. This retardation has undesired results, such as incomplete combustion and longer ignition delays that may negatively affect emissions. The timing adjustments provide for reduced emission levels that reduce or eliminate stumbling and/or hesitation during changing load conditions and help improve engine responsiveness by providing more complete combustion of fuel in the engine than the combustion that would take place without use of the present invention. The timing adjustments may be modified or fine-tuned as needed, for example, to eliminate white smoke emissions and engine stumble.

When a value for a particular engine speed and DFD is determined, that value is added, via summer 107, to a base timing value, thereby yielding a compensated timing value in deg c.a. Base timing refers to timing for fuel injectors that does not compensate for a load change as does the DFD, although the base timing value may compensate for conditions or circumstances other than load change, such as engine speed. The compensated timing value reflects the time relative to TDC when a fueling pulse is first received at the fuel injector to begin a fuel injection cycle.

Figure 2:
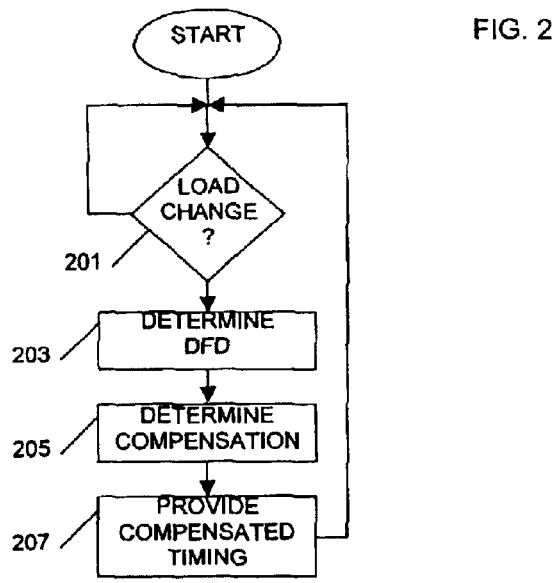
FIG. 2 is a flowchart illustrating a method of compensating fuel injection timing for engine load change in accordance with the invention.

A flowchart illustrating a method of compensating fuel injection timing for engine load change is shown in FIG. 2. At step 201, a load change is detected for an engine. Detection of a load change is described above with respect to the load change detector 101. At step 203, a DFD is determined using at least two fuel demand values. For example, DFD=(FD1−FD2)/TC, where TC is a time constant reflecting the time difference between the occurrence of FD1 and the occurrence of FD2. At step 205, timing compensation for the fuel injectors is determined. The DFD from step 203 and the present engine speed are utilized to determine a timing compensation value in deg c.a. At step 207, the compensation value from step 205 is added to the base timing, yielding a compensated time (in deg c.a.) at which a fuel pulse is delivered to a fuel injector.

The present invention has many advantages. One advantage is an environmental benefit by reducing exhaust emissions. The ability to comply with government-mandated emissions levels is thereby enhanced. The present invention also improves engine performance, for example, by increasing engine response and reducing or eliminating engine stumbling or hesitation during changing load conditions. Provided compensation adjusts for a change in engine load during steady-state or quasi-steady-state engine speed conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   detecting an engine load change for an engine;
   compensating fuel injection timing for at least one cylinder in the engine based on the engine load change, such that at least one of enhanced engine performance and lower emissions levels for the engine results.

2. The method of claim 1, wherein the step of detecting comprises determining a rate of change in fuel quantity requested for the engine.

3. The method of claim 1, wherein the step of compensating occurs during a period when a load change is detected.

4. The method of claim 1, wherein the step of compensating includes the step of compensating based on engine speed.

5. The method of claim 1, wherein the step of compensating comprises determining an injection timing to provide more complete combustion of fuel in the engine.

6. The method of claim 1, wherein the load change occurs while engine speed is substantially constant.

7. A method comprising the steps of:
   detecting an engine load change for an engine;
   determining a compensation value based on the engine load change;
   modifying injection timing according to the compensation value for at least one cylinder in the engine.

8. The method of claim 7, wherein the engine load change takes place when the engine is operating at a substantially constant engine speed.

9. The method of claim 7, wherein the step of determining the compensation value provides a value in crank angle degrees that yields a fuel injector timing adjustment that reduces emissions levels for the engine.

10. The method of claim 7, wherein the compensation value yields a fuel injector timing that results in improved engine performance.

11. The method of claim 8, wherein the step of detecting a load change comprises determining a rate of change in fuel quantity requested for the engine.

12. The method of claim 7, wherein the step of compensating occurs while a load change is detected.

13. The method of claim 7, wherein the step of determining comprises the step of determining engine speed to determine a compensation value.

14. The method of claim 7, wherein the step of determining comprises determining a compensation value that results in injection timing that provides more complete combustion of fuel in the engine.

15. An engine control module comprising:
   an engine load change detector, arranged and constructed to detect a load change for an engine;
   a compensation value determiner, arranged and constructed to establish at least one compensation value based on the load change;
   a summer, arranged and constructed to provide a modified fuel injection timing based on the compensation value.

16. The engine control module of claim 15, wherein the compensation value determiner comprises a look-up table comprising timing adjustments based on engine speed and differential fuel demand.

17. The engine control module of claim 15, wherein the at least one compensation value provides a fuel injector timing that reduces emissions levels for the engine.

18. The engine control module of claim 15, wherein the at least one compensation value provides a fuel injector timing that results in improved engine performance.

* * * * *